United States Patent
Natale et al.

(12) 
(10) Patent No.: US 6,260,765 B1
(45) Date of Patent: Jul. 17, 2001

(54) REMOTELY CONTROLLABLE THERMOSTAT

(75) Inventors: Nicholas A. Natale; Brian M. Boling, both of Knoxville, TN (US)

(73) Assignee: American Secure Care, LLC, Knoxville, TN (US)

( * ) Notice: Subject to any disclaimer, the term of this patent is extended or adjusted under 35 U.S.C. 154(b) by 0 days.

(21) Appl. No.: 09/513,110

(22) Filed: Feb. 25, 2000

(51) Int. Cl.$^7$ .............................. H04M 11/00; G05D 23/00
(52) U.S. Cl. ..................... 236/47; 236/51; 340/825.72; 379/102.05
(58) Field of Search ...................... 379/102.05; 236/47, 236/51; 340/825.72, 870.17

(56) References Cited

U.S. PATENT DOCUMENTS

| | | | |
|---|---|---|---|
| 4,316,577 | 2/1982 | Adams et al. | 236/46 R |
| 4,336,902 | 6/1982 | Neal | 236/51 X |
| 4,353,502 | 10/1982 | Myers | 179/2 A |
| 4,438,295 | 3/1984 | Hales | 179/2 A |
| 4,441,545 | 4/1984 | Alley et al. | 236/47 X |
| 4,845,773 | 7/1989 | Attallah | 236/51 X |
| 4,860,950 | 8/1989 | Reeser et al. | 340/825.69 |
| 4,898,230 | 2/1990 | Tsuchiyama et al. | 236/94 X |
| 5,318,224 | 6/1994 | Darby et al. | 236/47 |
| 5,326,027 | 7/1994 | Sulfstede | 307/155 X |
| 5,386,461 | 1/1995 | Gedney | 379/102 |
| 5,462,225 | * 10/1995 | Massara et al. | 236/47 |
| 5,476,221 | * 12/1995 | Seymour | 236/51 X |
| 5,838,776 | 11/1998 | Adkins, II et al. | 379/102.5 |

OTHER PUBLICATIONS

Temperature Alarm Phones You Before Your Pipes Freeze http://store.yahoo.com/comfort/phontemal.html.
Temperature Alarm; advanced remote temperature monitors with voice dialing http://store.yahoo.comm/comfort/temal.html.

Digi–Log Technologies Inc., *The Power Controller*; http://www.digi–log.com.
Digi–Log Technologies Inc., *The Power Controller*; http://www.digi–log.com/page2.html.
Digi–Log Technologies Inc., *The Power Controller*; http://www.digi–log.com/page4.html.

* cited by examiner

Primary Examiner—William Wayner
(74) Attorney, Agent, or Firm—Luedeka, Neely & Graham, P.C.

(57) ABSTRACT

A thermostat system for controlling activation of a temperature management system is operable in an energy-savings mode for enhancing energy savings and in a comfort mode for enhancing comfort, where the operating mode is selectable by a user. The thermostat system has operating mode control circuitry which includes (1) a manual mode control operable to cause the operating mode control circuit to switch between the energy-savings and the comfort states when pressed by the user, (2) a wireless receiver for receiving a wireless mode switching signal that causes the operating mode switching circuitry to switch between the energy-savings and the comfort states, and (3) telephone communication circuitry for receiving a telephonic mode switching signal that causes the operating mode switching circuitry to switch between the energy-savings and the comfort states. Thus, the present invention offers at least three convenient ways for the user to switch between energy-savings and comfort modes of operation. A temperature sensor senses the temperature of the air space and produces a sensed temperature signal based on the temperature of the air space. A controller produces an under-temperature signal when the sensed temperature signal indicates that the temperature is less than a minimum temperature and an over-temperature signal when the sensed temperature signal indicates that the temperature is greater than a maximum temperature. When the under-temperature or over-temperature signal is produced, the telephone communication circuitry places a telephone call to a telephone number of a designated receiving telephone to give a warning concerning the over- or under-temperature condition.

17 Claims, 6 Drawing Sheets

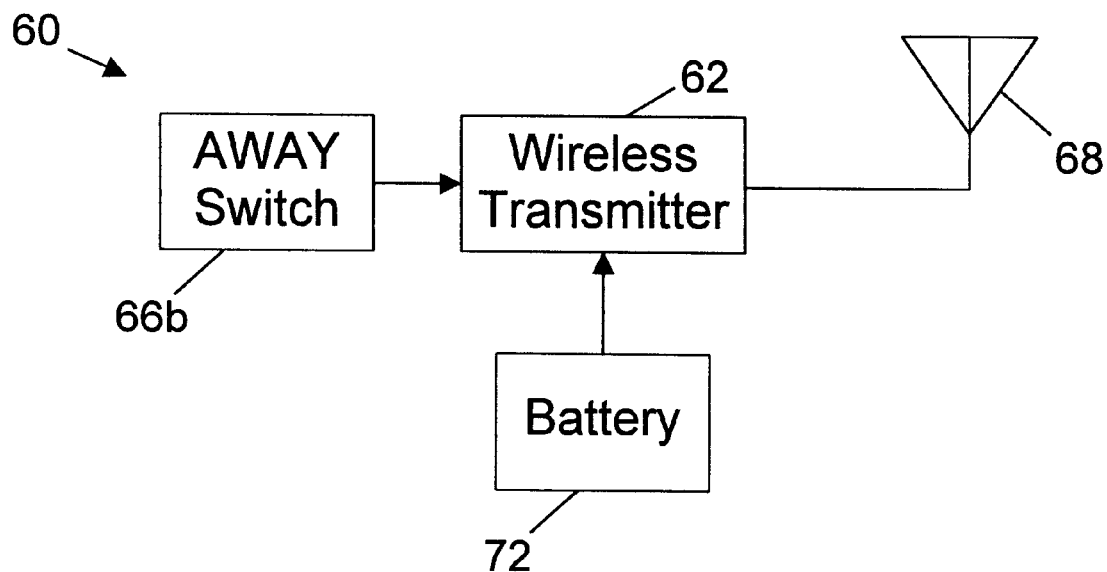
*Fig. 3*
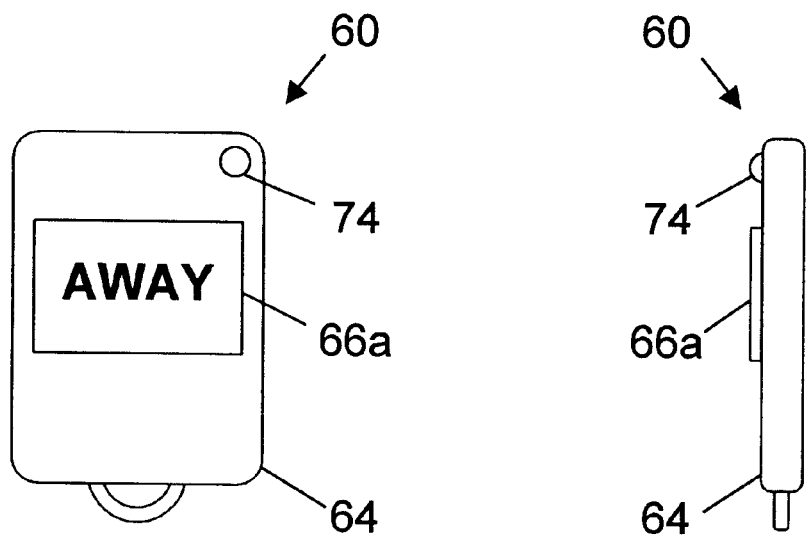
*Fig. 4a*  *Fig. 4b*

REMOTELY CONTROLLABLE THERMOSTAT

TECHNICAL FIELD

The present invention is generally directed to thermostats. More particularly, the invention is directed to a thermostat that is remotely controllable by a radio frequency or telephone link.

BACKGROUND OF THE INVENTION

Heating and cooling systems in most homes are controlled by a thermostat which is set to a threshold temperature. In heating mode, when the room temperature drops below the threshold temperature, the heating system is activated to heat the home. In cooling mode, when the room temperature rises above the threshold temperature, the cooling system is activated to cool the home.

To save energy, it is desirable to adjust the thermostat's threshold temperature to an offset temperature when the occupants of the home are away. For example, significant energy savings may result by using an offset temperature of 10 degrees below the normal threshold temperature for the heating mode, or 10 degrees above the normal threshold temperature for the cooling mode.

In order to realize the potential energy savings of an offsetable thermostat, offset temperatures must be easy to initially program into the thermostat, and easy to activate once programmed. If the programming and use of an offsetable thermostat is not easy and intuitive, users are likely to become frustrated with it and not use it, thus forgoing possible energy and money savings.

Also, there are often times when a user intends to activate a temperature offset before leaving home, but forgets to do so until the user is a long distance from home. Sometimes, the user remembers to activate the temperature offset while leaving the home, such as when getting in the car to drive away. In such situations, it is desirable to be able to remotely activate the offset temperature, such as from the car while backing out of the driveway of the home, or from a hotel room that is hundreds of miles away from the home.

Therefore, a thermostat is needed that provides offset temperatures for energy savings, that is easy to program and operate, and that may be operated remotely, either from a few feet away or a few hundred miles away.

SUMMARY OF THE INVENTION

The foregoing and other needs are met by a thermostat system for controlling activation of a temperature management system based on a temperature of an air space. The thermostat system is operable in an energy-savings mode for enhancing energy savings and in a comfort mode for enhancing comfort, where the operating mode is selectable by a user. The thermostat system includes operating mode control circuitry for switching between an energy-savings state and a comfort state, where the energy-savings state corresponds to system operation in the energy-savings mode and the comfort state corresponds to system operation in the comfort mode. The operating mode switching circuitry includes a manual mode control operable to cause the operating mode switching circuit to switch between the energy-savings and the comfort states when pressed by the user. The operating mode switching circuitry also includes a wireless receiver for receiving a wireless mode switching signal that causes the operating mode switching circuitry to switch between the energy-savings and the comfort states. The operating mode switching circuitry further includes telephone communication circuitry for receiving a telephonic mode switching signal that causes the operating mode switching circuitry to switch between the energy-savings and the comfort states.

Thus, the present invention offers at least three convenient ways for the user to switch between energy-savings and comfort modes of operation. A manual switch is provided on the thermostat housing, a wireless receiver is provided to allow the user to switch modes from a few feet to a few hundred feet away, and telephone communication circuitry is provided to allow the user to switch modes from practically anywhere in the world.

The thermostat system includes a temperature sensor for sensing the temperature of the air space and for producing a sensed temperature signal based on the temperature of the air space. A manual temperature set point adjustment control is used to select, based on manual adjustments made by an operator, a comfort high temperature set point value representing a comfort high temperature set point, and a comfort low temperature set point value representing a comfort low temperature set point. The manual temperature set point adjustment circuit is also used to select an energy-savings high temperature set point value representing an energy-savings high temperature set point, and an energy-savings low temperature set point value representing an energy-savings low temperature set point. The thermostat system includes a memory device for storing the comfort high and low temperature set point values and the energy-savings high and low temperature set point values.

The thermostat system also includes a controller for receiving the sensed temperature signal and the state of the operating mode switching circuitry, and for accessing the comfort high and low temperature set point values and the energy-savings high and low temperature set point values from the memory device. Based on the sensed temperature signal, the state of the operating mode switching circuitry, and the temperature set point values, the controller activates the temperature management system to heat or cool the air space. Preferably, the controller activates the temperature management system to heat the air space when the operating mode switching circuitry is in the energy-savings state, and the sensed temperature signal indicates that the temperature of the air space is less than the energy-savings low temperature set point. The controller also activates the temperature management system to heat the air space when the operating mode switching circuitry is in the comfort state, and the sensed temperature signal indicates that the temperature of the air space is less than the comfort low temperature set point. The controller activates the temperature management system to cool the air space when the operating mode switching circuitry is in the energy-savings state, and the sensed temperature signal indicates that the temperature of the air space is greater than the energy-savings high temperature set point. The controller also activates the temperature management system to cool the air space when the operating mode control means is in the comfort state, and the sensed temperature signal indicates that the temperature of the air space is greater than the comfort high temperature set point.

In preferred embodiments of the invention, the controller produces an under-temperature signal when the sensed temperature signal indicates that the temperature of the air space is less than a minimum temperature and an over-temperature signal when the sensed temperature signal indicates that the temperature of the air space is greater than a maximum temperature. When the under-temperature or over-temperature signal is produced, the telephone communication circuit generates a notification telephone signal. The telephone communication circuit communicates the notification telephone signal by placing a telephone call to a telephone number of a designated receiving telephone.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 3 is a functional block diagram of a wireless remote control unit according to a preferred embodiment of the invention;

FIG. 4a is a front view of a wireless remote control unit according to a preferred embodiment of the invention;

FIG. 4b is a side view of a wireless remote control unit according to a preferred embodiment of the invention;

DETAILED DESCRIPTION OF THE PREFERRED EMBODIMENT

Figure 1:
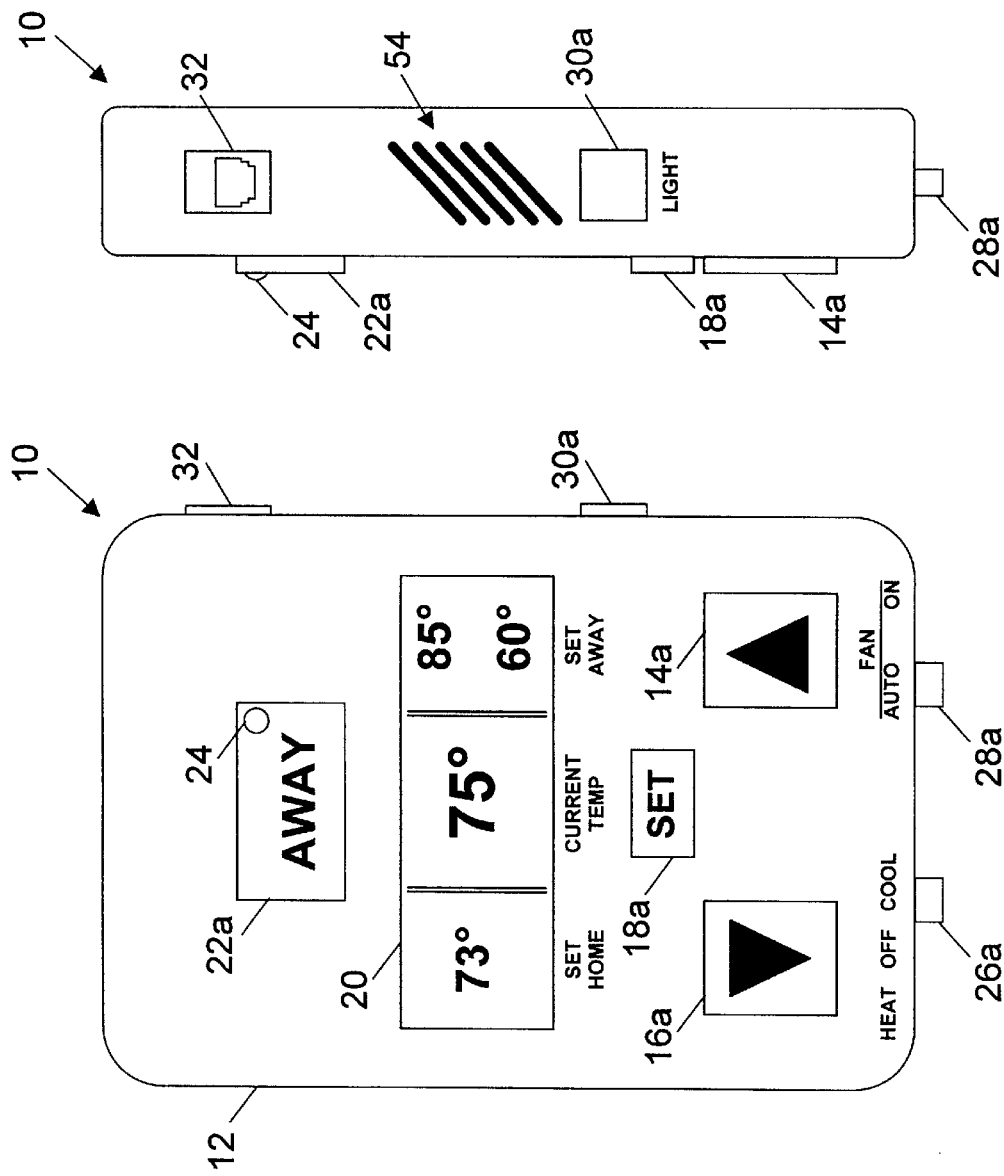
FIG. 1a is a front view of a remotely controllable thermostat according to a preferred embodiment of the invention.
FIG. 1b is a side view of a remotely controllable thermostat according to a preferred embodiment of the invention.

Shown in FIGS. 1a and 1b is a thermostat 10 for controlling the activation of a heating/cooling system, such as a home heat pump, based on a sensed temperature. The thermostat 10 includes a housing 12 which houses electronic control circuits, as described in more detail hereinafter. Preferably, the housing 12 is formed from injection molded thermoplastic. The thermostat 10 includes several manually-operated control buttons, such as a temperature increment control button 14a, a temperature decrement control button 16a, and a temperature set control button 18a. As described in greater detail below, these control buttons 14a, 16a, and 18a allow a user to easily adjust comfort temperature set points and energy-savings temperature set points.

The terms "comfort" and "energy-savings" are used herein to describe two operational modes of the thermostat 10. Generally, when the thermostat 10 is in the comfort mode, the thermostat 10 controls the heating/cooling system to maintain a comfortable temperature according to the comfort temperature set points. When the thermostat 10 is in energy-savings mode, the thermostat 10 controls the heating/cooling system to use less energy by maintaining temperatures that are either cooler than would typically be comfortable during cold weather, or warmer than would typically be comfortable in hot weather.

Mounted in a front surface of the housing 12 is a large display screen 20, such as an LCD display. In the preferred embodiment of the invention, the screen 20 is preferably divided into three sections. One of the sections of the screen 20, such as the left-most section as shown in FIG. 1a, displays the comfort temperature set point. Another of the sections of the screen 20, such as the middle section, displays a currently-measured temperature. A third section of the screen 20, such as the right-most section, displays upper and lower energy-savings temperature set points for when the user is away from home.

The large button in the front center of the housing 12 is referred to herein as the AWAY button 22a. The designation "AWAY" refers to the use of the button to select the energy-savings mode while occupants are away from the building. As described in more detail hereinafter, when a user presses and releases the AWAY button 22a the thermostat 10 switches between using the comfort temperature set point and the energy-savings temperature set points. When the energy-savings temperature set points are in use, an indicator light 24, such as an LED, is illuminated. The light 24, which may easily be seen from across the room, indicates to the user that the energy-savings temperature set points are active.

As do most thermostats, the present invention further includes a heat/cool control 26a to switch the heating/cooling system between heating and cooling functions, and a fan auto/on control 28a to switch the heating/cooling system's air circulation fan between an automatic mode and an always-on mode.

As shown in FIG. 1b, on the side of the housing 12 is a display light control button 30a. When the button 30a is pressed, the display screen 20 is illuminated by a display light 31. (See FIG. 2). Also on the side of the housing 12 is a phone jack 32, such as a standard RJ31 jack, for connecting the thermostat 10 to a telephone line. The functions of the thermostat 10 that use the telephone line are described in more detail below.

Figure 2:
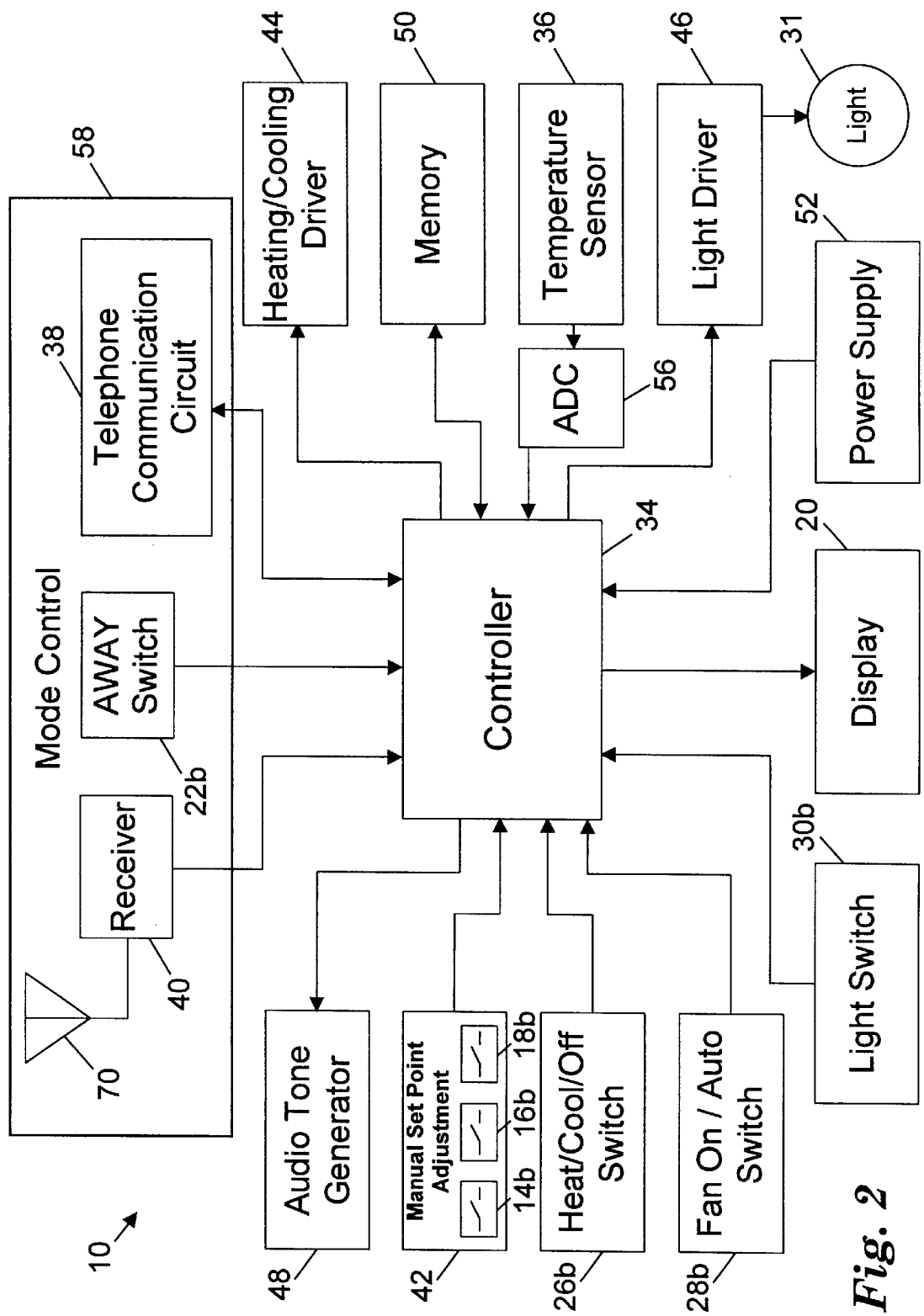
FIG. 2 is a functional block diagram of a remotely controllable thermostat according to a preferred embodiment of the invention.

Shown in FIG. 2 is a functional block diagram of the electronic circuits included in the preferred embodiment of the thermostat 10. The temperature controlling functions of the thermostat 10 are preferably performed by a microprocessor controller 34. The controller 34 performs these controlling functions based on the status of several switches, including an AWAY switch 22b operated by the AWAY button 22a, a heat/cool switch 26b operated by the heat/cool control 26a, the fan-on/auto switch 28b operated by the fan auto/on control 28a, and the light switch 30b operated by the display light control 30a. As explained below, the switches 22b, 26b, and 28b set electrical states that are monitored by the controller 34. Preferably, the state of these switches may be changed by way of the buttons 22a, 26b, and 28b, or by software or firmware commands, such as received by way of telephone or wireless signals.

The operation of the controller 34 is also determined by several input signals, including a temperature signal generated by a temperature sensor 36, a telephonic mode switching signal generated by a telephone communication circuit 38, a wireless mode switching signal generated by a wireless receiver 40, and a temperature adjust signal generated by a manual temperature set point adjustment control 42.

In the preferred embodiment of the invention, the controller 34 generates several output signals to control operation of the thermostat 10. As discussed in more detail below, the controller 34 generates a heating/cooling control signal that is sent to a heating/cooling driver circuit 44. Based on the heating/cooling control signal, the heating/cooling driver circuit 44 controls the state of the heating/cooling system.

The controller 34 also generates a display driver signal to control the display device 20, a light driver signal to control a display light driver circuit 46, and a tone generator driver signal to activate an audio tone generator 48.

Preferably, the thermostat 10 includes a memory 50, such as a RAM device, connected to the controller 34 for storing user-programmed temperature set points and telephone numbers. In the preferred embodiment of the invention, the memory 50 also includes an EEPROM device for storing default temperature set points. For example, the memory 50 may store default temperature set points of 73° F. for a comfort temperature set point, 85° F. for an energy-savings high temperature set point, and 60° F. for an energy-savings low temperature set point.

The controller 34 and other thermostat components are powered by a power supply circuit 52. In the preferred embodiment, the power supply 52 is connected to a standard 120 volt AC power circuit within the building in which the thermostat 10 is located. The power supply 52 includes power conditioning circuitry for converting the 120 volt AC power to the appropriate DC voltages required by the thermostat components and for inhibiting the ability of power surges to damage the thermostat components. Preferably, the power supply 52 also includes a battery to provide backup power to the thermostat 10 when the building power fails. Among other things, the battery power maintains the contents of the memory 50 until building power is restored.

In operation, a user programs the temperature set points of the thermostat 10 using the manual temperature set point adjustment control 42 which includes the temperature increment control button 14a, the temperature decrement control button 16a, and the temperature set control button 18a. When the set control button 18a is pressed, the set switch 18b changes state. (See FIG. 2). Preferably, when the user presses set control button 18a once, thus causing the set switch 18b to change state once, the controller 34 enters a comfort temperature set mode and accesses the memory 50 to retrieve the stored comfort temperature set point. The first time that the thermostat 10 is programmed, the stored comfort temperature set point is the factory-programmed default value stored in the EEPROM portion of the memory 50. Each time the user presses the temperature increment control button 14a or the temperature decrement control button 16a within a given period of time after the controller 34 enters the comfort temperature set mode, the controller 34 increments or decrements the comfort temperature set point by one degree. Some predetermined time after the user last presses the temperature increment control button 14a or the temperature decrement control button 16a, the controller 34 stores the new comfort temperature set point in the RAM portion of the memory 50.

In the preferred embodiment, when the user presses the set control button 18a twice within some minimum period of time, thus causing the set switch 18b to change state twice, the controller 34 enters an energy-savings high temperature set mode and accesses the memory 50 to retrieve the stored energy-savings high temperature set point. The first time that the thermostat 10 is programmed, the stored energy-savings high temperature set point is the factory-programmed default value stored in the EEPROM portion of the memory 50. Each time the user presses the temperature increment control button 14a or the temperature decrement control button 16a within a given period of time after the controller 34 enters the energy-savings high temperature set mode, the controller 34 increments or decrements the energy-savings high temperature set point by one degree. Some predetermined time after the user last presses the temperature increment control button 14a or the temperature decrement control button 16a, the controller 34 stores the new energy-savings high temperature set point in the RAM portion of the memory 50.

Preferably, when the user presses the set control button 18a three times within some minimum period of time, thus causing the set switch 18b to change state three times, the controller 34 enters an energy-savings low temperature set mode and accesses the memory 50 to retrieve the stored energy-savings low temperature set point. The first time that the thermostat 10 is programmed, the stored energy-savings low temperature set point is the factory-programmed default value stored in the EEPROM portion of the memory 50. Each time the user presses the temperature increment control button 14a or the temperature decrement control button 16a within a given period of time after the controller 34 enters the energy-savings low temperature set mode, the controller 34 increments or decrements the energy-savings low temperature set point by one degree. Some predetermined time after the user last presses the temperature increment control button 14a or the temperature decrement control button 16a, the controller 34 stores the new energy-savings low temperature set point in the RAM portion of the memory 50.

The controller 34 generates the display driver signal for activating the display device 20 to display in numerical format the comfort, the energy-savings high, and the energy-savings low temperature set points that are currently stored in the RAM portion of the memory 50. The display device 20 also indicates the set point values as they are incremented or decremented during the programming process described above. An example of the appearance of the set point values displayed on the display device 20 is shown in FIG. 1a.

In an alternative embodiment of the invention, the display device 20 displays only the energy-savings temperature set point that is relevant to the current operating mode of the thermostat 10. For example, if the heat/cool switch 26b is set to heating mode, then the display device 20 displays the energy-savings high temperature set point, but not the energy-savings low temperature set point. If the heat/cool switch 26b is set to cooling mode, then the display device 20 displays the energy-savings low temperature set point, but not the energy-savings high temperature set point. In this manner, the current mode of operation and the current energy-savings temperature set point is more clearly indicated to the user.

As mentioned previously, the thermostat 10 includes a temperature sensor 36, such as a thermistor. The temperature sensor 36 generates a sensed analog temperature signal based upon the temperature of the air-space within which the thermostat 10 is located. Preferably, the temperature sensor 36 is mounted within the housing 12 near a vent 54 that provides for air communication between the inside and the outside of the housing 12. Alternatively, the temperature sensor 36 may be located outside the housing 12 and electrically connected to the thermostat 10 via a sensor wire. Preferably, the thermostat 10 includes an analog-to-digital converter (ADC) 56 for receiving the sensed analog temperature signal and producing a digital temperature signal based thereon.

The controller 34 receives the digital temperature signal from the ADC 56 and determines, based on the temperature signal, the currently-active temperature set points, and the status of the heat/cool switch 26b, whether to activate the heating/cooling system to adjust the building temperature. Following are exemplary situations in which the controller 34 will activate the heating/cooling system.

For example, consider the situation when the heat/cool control 26a is set to HEAT. If the thermostat 10 is in the energy-savings mode, and the temperature signal indicates that the temperature of the air-space, such as 57° F., is less than the energy-savings low temperature set point, such as 60° F., then the controller 34 generates a heating-activation control signal. Also, if thermostat 10 is in comfort mode, and the temperature signal indicates that the temperature of the air-space, such as 65° F., is less than the comfort low temperature set point, such as 73° F., then the controller 34 generates a heating-activation control signal. In either case, based on the heating-activation control signal, the heating/cooling driver circuit 44 activates the heating/cooling system to heat the air-space.

Now consider the situation when the heat/cool control 26a is set to COOL. If the thermostat 10 is in energy-savings mode, and the temperature signal indicates that the temperature of the air-space, such as 88° F., is greater than the energy-savings high temperature set point, such as 85° F., then the controller 34 generates a cooling-activation control signal. Further, if the thermostat 10 is in comfort mode, and the temperature signal indicates that the temperature of the air-space, such as 80° F., is greater than the comfort high temperature set point, such as 73 ° F., then the controller 34 generates a cooling-activation control signal. In either case, based on the cooling-activation control signal, the heating/cooling driver circuit 44 activates the heating/cooling system to cool the air-space.

Thus, by providing for the programming of energy-savings temperature set points, use of the invention can result in significant energy savings for the user. While the building is unoccupied, the energy-savings low and high temperature set points may be set to temperatures below or above which the temperature of the air-space does not often go. As a result, the heating/cooling system will turn on less often to heat or cool the air-space, thus reducing energy consumption and the costs thereof. For example, the energy-savings low temperature set point may be programmed to be in the 40–50° F. range, which would result in significant energy savings, but which should maintain the temperature at a level sufficient to prevent pipes in the building from freezing.

A significant advantage of the present invention is the ease with which the user may switch from the comfort mode to the energy-savings mode, and visa versa. As shown in FIG. 2, the thermostat 10 includes a mode control circuit 58 which provides the user with at least three different ways to switch the system operating mode. Mode switching may be accomplished (1) manually at the thermostat 10, (2) via wireless remote control, and (3) via telephone commands.

As discussed above, manual switching is accomplished using a manual mode control, such as the large and prominently-positioned AWAY button 22a. With one press of the AWAY button 22a, the state of the AWAY switch 22b is toggled, thus causing the controller 34 to switch between comfort mode operation and energy-savings mode operation. For example, if a homeowner is hurriedly leaving the home, such as on the way to work for the day, the homeowner can easily toggle the thermostat 10 to the energy-savings mode by pressing the AWAY button 22a on the way out the door. The size and prominent position of the button 22a on the housing 12 make it easy to find and operate, even in low-light conditions.

The preferred embodiment of the invention includes the audio tone generator 48 for generating an audible tone whenever the thermostat 10 switches between the comfort mode and the energy-savings mode of operation. Preferably, the controller 34 activates the generator 48 to produce the tone whenever the mode switching is successfully accomplished, whether by manual switching using the AWAY button 22a, by wireless remote switching, or by telephone switching. In an especially preferred embodiment, the generator 48 produces a single tone to indicate that the thermostat 10 has been switched into the energy-savings mode, and two sequential tones to indicate that the thermostat 10 has been switched into the comfort mode. In an alternative embodiment, the generator 48 comprises a voice generation chip that generates an audible voice message such as "comfort" or "energy savings" when the thermostat 10 switches from one mode to the other.

As shown in FIG. 2, the mode control section 58 also includes the wireless receiver 40, such as a radio-frequency (RF) receiver. A preferred embodiment of the invention includes a wireless remote control 60, as depicted in FIG. 3, that includes a wireless transmitter 62 operating on the same frequency as the receiver 40. As shown in FIGS. 4a and 4b, the transmitter 62 is housed within a hand-held transmitter housing 64, preferably constructed from high-impact-strength thermoplastic. The housing 64 is sized to be conveniently carried on a key ring. Alternatively, the housing 64 may be mounted on a wall, such as near a doorway of the building.

On the transmitter housing 64 shown in FIGS. 4a and 4b is a prominent AWAY button 66a which, when pressed, operates an AWAY switch 66b as shown in FIG. 3. When the AWAY switch 66b is operated, the transmitter 62 transmits a wireless signal via a transmitter antenna 68. With reference to FIG. 2, the thermostat 10 receives the wireless signal via a receiver antenna 70 and the receiver 40. When the wireless signal is received, the receiver 40 generates a mode-switching signal that is sent to the controller 34. Generation of the mode-switching signal causes the controller 34 to switch between comfort mode operation and energy-savings mode operation. In the interest of keeping the wireless remote 60 small and lightweight, the transmitter 62 is preferably powered by a small battery 72. Thus, the transmitter 62 operates at a relatively low power which typically limits its useable range to less than one hundred feet.

Figure 5:
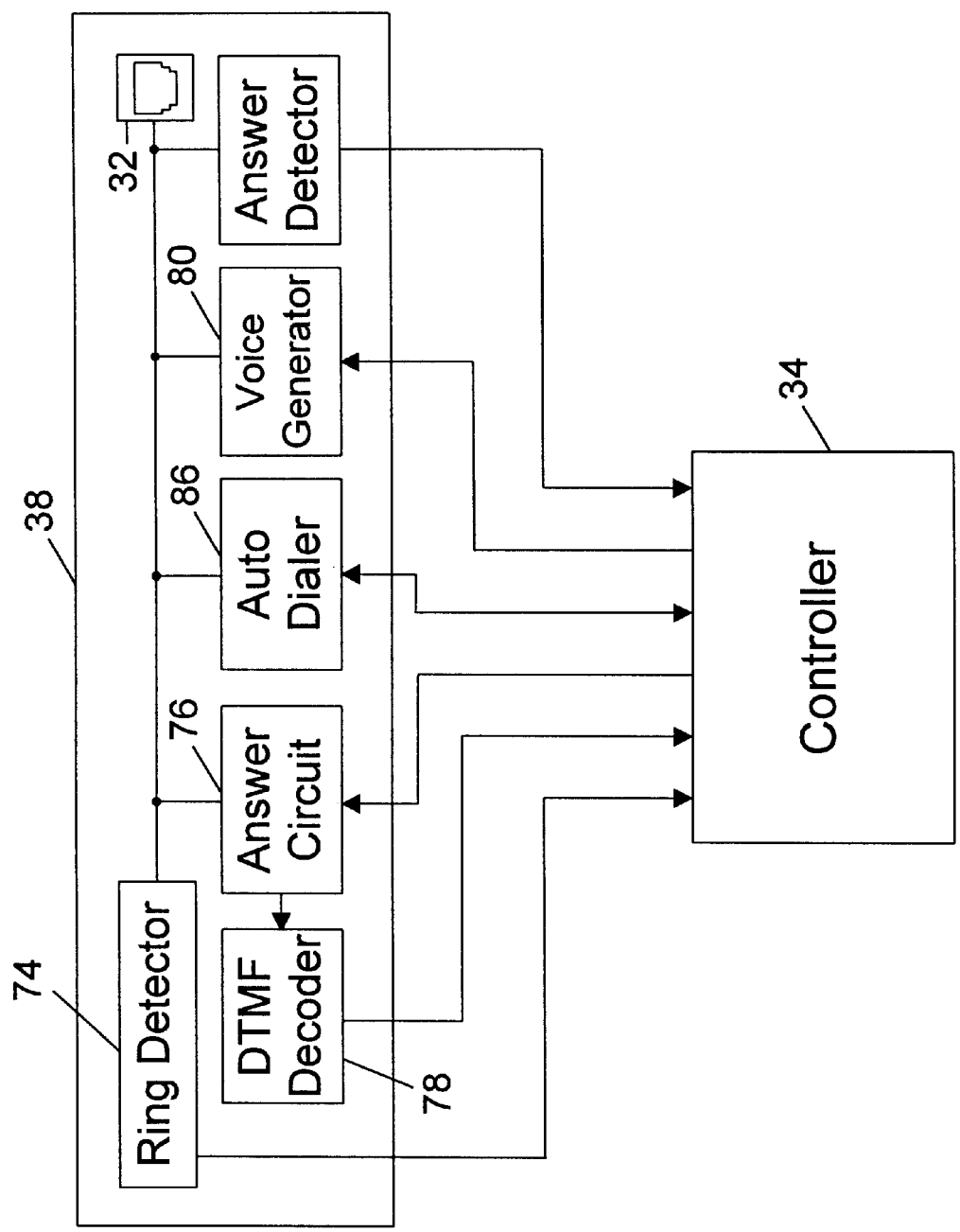
FIG. 5 is a functional block diagram of a telephone communication circuit according to a preferred embodiment of the invention.

When a user is beyond the useable range of the wireless remote 60, but has access to a telephone, the user may take advantage of the third way of switching the operating mode of the thermostat 10. Shown in FIG. 5 are components of the telephone communication circuit 38 of the preferred embodiment of the thermostat 10. These components include a ring detector 74, an answer circuit 76, and a touch-tone decoder 78, all of which are connected to a standard telephone line through the telephone jack 32.

When the user places a telephone call to the telephone number of the telephone line to which the thermostat 10 is connected, the ring detector 74, such as a TCM1520A chip manufactured by Texas Instruments, detects a ringing voltage on the telephone line. When a ringing voltage is detected, the ring detector 74 sends a ring detect signal to the controller 34. When the controller 34 receives the ring detect signal, the controller 34 sends an answer signal to the answer circuit 76. The answer signal causes the answer circuit 76, such as an electromechanical or solid-state relay, to connect the touch-tone decoder 78 to the telephone line. The touch-tone decoder 78, such as a MT3270 chip manufactured by Mitel Corporation, converts Dual-Tone Multi-Frequency (DTMF), i.e. touch-tone, signals into 4-bit serial data.

Preferably, once the answer circuit 76 has connected the telephone line to the touch-tone decoder 78, the controller 34 activates a voice generation circuit 80 to produce a voice greeting for the caller. In the preferred embodiment, the voice generation circuit 80 includes memory for storing several digitally-coded voice messages and a microprocessor for retrieving a particular one of the voice messages based on input from the controller 34. The preferred voice generation circuit 80 also includes a digital-to-analog converter (DAC) to convert the voice message from digital to analog format, and audio conditioning circuitry to amplify and condition the analog voice message to be sent to the caller over the telephone line.

In the preferred embodiment of the invention, the voice greeting generated by the voice generation circuit 80 first asks the caller to enter an identification code or password, such as by entering a four-digit number using the keypad on the caller's telephone. The touch-tone decoder 78 decodes the DTMF tones corresponding to the identification code and provides the decoded numbers to the controller 34. Once the controller 34 has verified that the identification code matches a code previously stored in the memory 50, the controller 34 activates the voice generation circuit 80 to provide the caller with a verbal list of options and the corresponding telephone keypad keys to press to choose the options. The options may include reporting the current operating mode of the thermostat, reporting the current measured temperature, switching the thermostat's operating mode between comfort and energy-savings modes, switching the thermostat's operating mode between heating and cooling modes, adjusting the temperature set points, and turning off the heating/cooling system.

For example, consider a situation in which a homeowner has gone on a trip away from home and cannot recall whether the home's thermostat 10 is set to comfort or energy-savings mode. To determine the thermostat's current status, the homeowner places a telephone call to the telephone line connected to the thermostat 10, enters the proper identification code, and then enters the keypad number, such as "3", corresponding to the option of getting a report of the thermostat's current operating mode. The touch-tone decoder 78 receives the DTMF tone corresponding to keypad number "3" and generates a corresponding 4-bit digital value. Upon receipt of the 4-bit value from the decoder 78, the controller 34 preferably activates the voice generation circuit 80 to retrieve from its memory a digitally-coded voice message corresponding to the current mode of operation. For example, the stored messages may include: "comfort heating mode", "energy-savings heating mode", "comfort cooling mode", or "energy-savings cooling mode."

If the homeowner wishes to switch between comfort and energy-savings modes, the homeowner enters the number corresponding to comfort/energy-savings mode switching on the telephone keypad, such as "4". The touch-tone decoder 78 receives the DTMF tone corresponding to keypad number "4" and generates a corresponding 4-bit digital value. In this situation, the 4-bit digital value generated by the decoder 78 is the comfort/energy-savings mode-switching signal. Upon receipt of the 4-bit value from the decoder 78, the controller 34 switches between comfort mode operation and energy-savings mode operation.

As a further example, the homeowner may wish to switch between heating and cooling operating modes while away from home. To do so, the homeowner enters the number corresponding to heating/cooling mode switching on the telephone keypad, such as "5". The touch-tone decoder 78 receives the DTMF tone corresponding to keypad number "5" and preferably generates a corresponding 4-bit digital value. In this situation, the 4-bit digital value generated by the decoder 78 is the heating/cooling mode-switching signal. Upon receipt of the 4-bit value from the decoder 78, the controller 34 switches from heating to cooling operation, or visa-versa.

In a preferred embodiment of the invention, the answer circuit 76 may be programmed to answer an incoming call after a particular number of rings, where the number of rings depends on the current thermostat operating mode. Such a system is useful in communicating the current thermostat mode to the user by the number of rings. For example, the answer circuit 76 may be programmed to answer the call on the third ring when the thermostat is in comfort mode, and on the fifth ring when the thermostat is in energy-savings mode. Thus, if the user calls the thermostat and receives no answer after the third ring, the user knows that the thermostat is in the energy-savings mode. In this manner, if the user wishes to leave the thermostat in the energy-savings mode, the user may simply terminate the call before the answer circuit 76 answers the call on the fifth ring, and thereby avoid possible long distance telephone fees.

Figure 6:
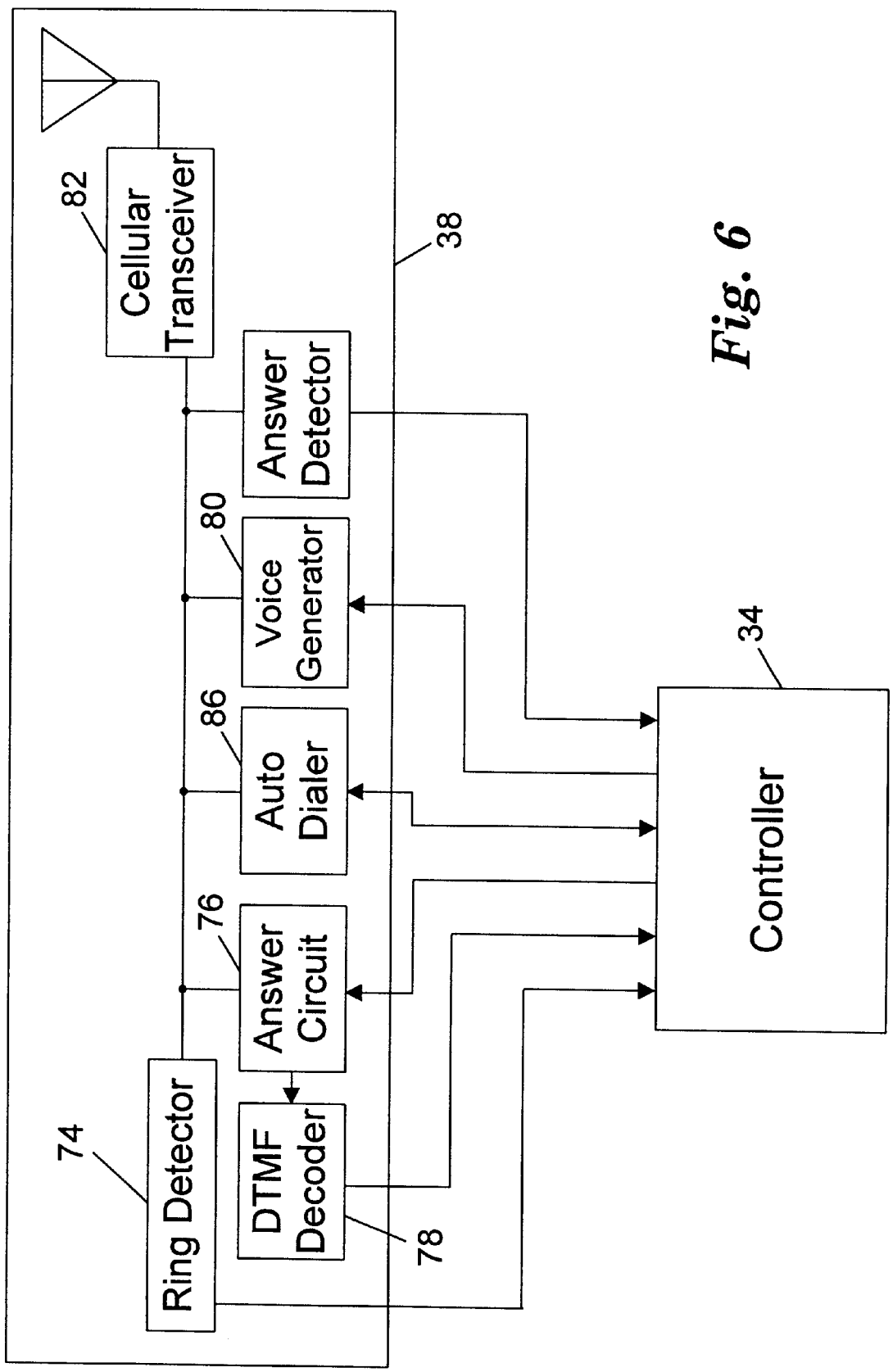
FIG. 6 is a functional block diagram of the telephone communication circuit according to another embodiment of the invention.

In another embodiment of the invention depicted in FIG. 6, the telephone communication circuit 38 includes a cellular transceiver 82. In this embodiment, the controller 34 may be instructed to switch between comfort and energy-savings modes based on touch-tone commands received by the cellular transceiver 82. Preferably, the cellular transceiver 82 is also connected to a modem 84 within the thermostat 10, such that the thermostat 10 may be controlled based on wireless digitally-encoded signals received by the receiver 82 and demodulated by the modem 84.

Figure 7:
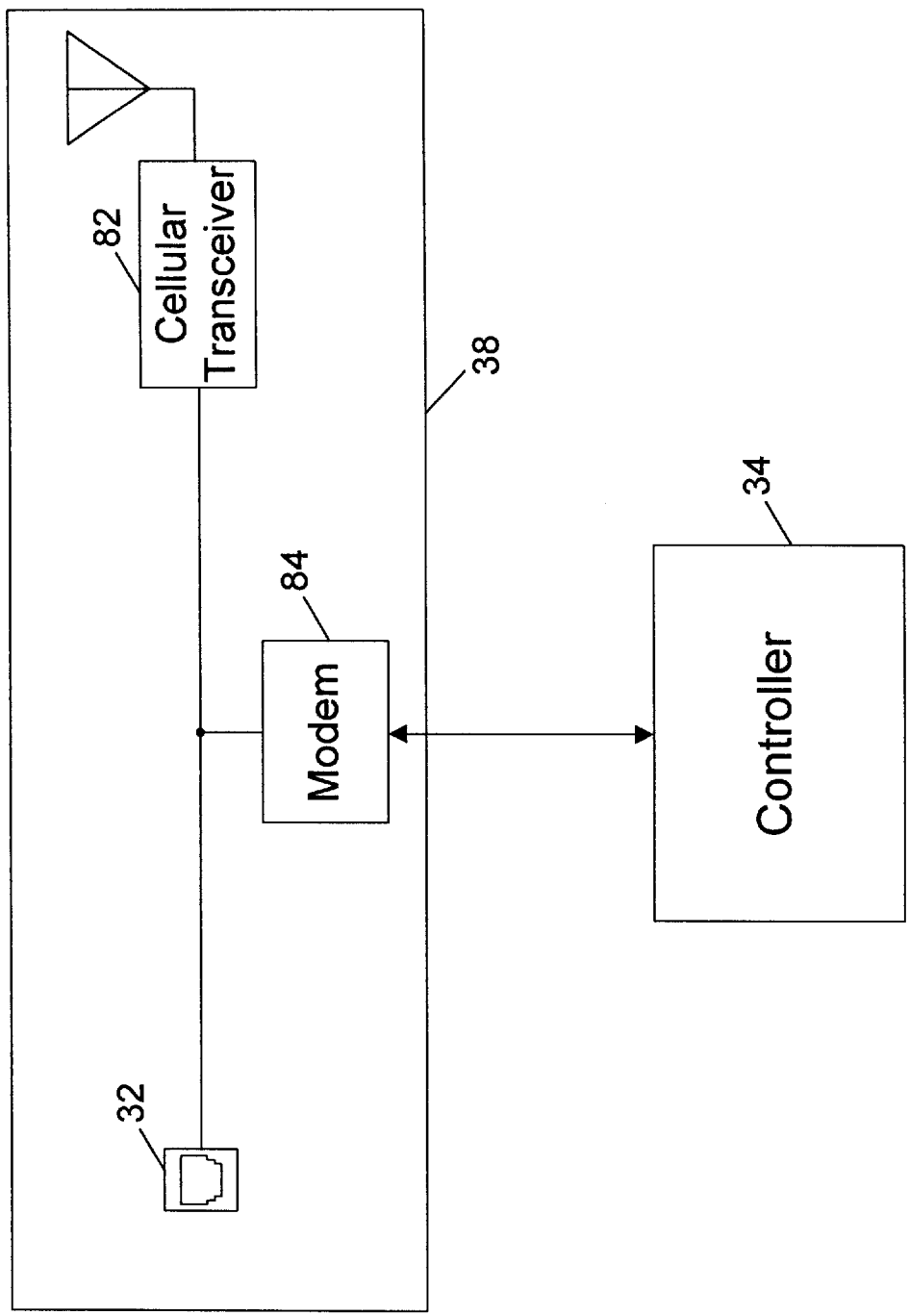
FIG. 7 is a functional block diagram of the telephone communication circuit according to yet another embodiment of the invention.

In an alternative embodiment of the invention as depicted in FIG. 7, the telephone communication circuit 38 includes a modem 84 connected to the telephone jack 32. In this embodiment, the controller 34 may be instructed to switch between comfort and energy-savings modes by digitally-encoded commands generated by a remote computer connected via telephone lines. The controller 34 may also report the current operating mode, the current measured temperature, and the temperature set points to the remote computer via the modem 84. In the embodiment of FIG. 7, the telephone communication circuit 38 further includes the cellular receiver 82 connected to the modem 84. With this arrangement, the controller 34 may send/receive digitally-encoded commands to/from a remote computer connected via a digital cellular telephone link.

In addition to the ability to control the thermostat via incoming telephone calls, the present invention can also initiate outgoing telephone calls to notify a user of extreme temperature conditions. As discussed previously, the controller 34 receives a digital temperature signal from the ADC 56 which is based on the temperature of the air-space as sensed by the temperature sensor 36. If the controller 34 determines based on the digital temperature signal that the temperature of the air-space has dropped below a predetermined minimum temperature, the controller 34 produces an under-temperature signal. Also, if the controller 34 determines that the temperature of the air-space has risen above a predetermined maximum temperature, the controller 34 produces an over-temperature signal. If either the under-temperature or the over-temperature signal is produced, the controller 34 retrieves from the memory 50 a previously-stored telephone number. The controller 34 then sends the retrieved telephone number to an automatic dialer 86, as shown in FIGS. 5 and 6, and activates the automatic dialer 86 to dial the number. If the call is answered, the answer is detected by an answer detector circuit 88, which then generates a signal to indicate to the controller 34 that the call has been answered.

Once the controller 34 receives an indication that the call is answered, the controller 34 activates the voice generation circuit 80 to generate a voice message on the telephone line to notify the receiving party that there is an extreme temperature condition. For example, if the over-temperature signal has been produced, the controller 34 activates the voice generation circuit 80 to generate a stored voice message such as "Warning! Over-temperature condition. Current temperature is 96° F." The announced temperature is preferably based upon the digital temperature value which the controller 34 provides to the voice generation circuit 80. Similarly, if the under-temperature signal has been produced, the controller 34 activates the generation circuit 80 to generate the appropriate stored voice message.

In the preferred embodiment of the invention, the controller 34 generates the over-temperature signal if the sensed temperature is greater than the energy-savings high temperature set point plus a predetermined number of degrees, such as 10 degrees. For example, if the energy-savings high temperature set point is 85° F., the controller generates the over-temperature signal when the sensed temperature is greater than 95° F. The controller 34 preferably generates the under-temperature signal if the sensed temperature is less than the energy-savings low temperature set point minus a predetermined number of degrees, such as 10 degrees. For example, if the energy-savings low temperature set point is 60° F., the controller 34 generates the under-temperature signal when the sensed temperature is less than 50° F.

Thus, in those situations in which temperature control is critical, the out-going notification call feature of the thermostat 10 provides a significant advantage over prior thermostat systems. For example, if a homeowner had to leave an unattended pet in the home, the out-going call feature of the thermostat 10 provides some peace of mind for the homeowner. The homeowner may be assured that if a problem develops with the home's heating/cooling system such that it cannot maintain a safe temperature for the pet, the homeowner will receive a notification call. The outgoing call feature is also useful in industrial or laboratory settings where precise temperature control is necessary to protect sensitive electronic equipment.

One skilled in the art will appreciate that the outgoing notification call feature may also be implemented in the embodiment of the invention having a cellular transceiver 82 as shown in FIG. 7. This embodiment is especially useful in those situations where a telephone line is not available at the location of the thermostat 10.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. A thermostat system for controlling activation of a temperature management system based on a temperature of an air space, the thermostat system operable in an energy-savings mode for enhancing energy savings and in a comfort mode for enhancing comfort, where the operating mode is selectable by a user, the thermostat system comprising:

operating mode control means for switching between an energy-savings state and a comfort state, where the energy-savings state corresponds to system operation in the energy-savings mode and the comfort state corresponds to system operation in the comfort mode, the operating mode control means comprising:

a manual mode control operable to cause the operating mode control means to switch between the energy-savings and the comfort states when pressed by the user;

a wireless receiver for receiving a wireless mode switching signal, the operating mode control means being operable to switch between the energy-savings and the comfort states when the wireless mode switching signal is received; and telephone communication means for receiving a telephonic mode switching signal, the operating mode control means being operable to switch between the energy-savings and the comfort states when the telephonic mode switching signal is received;

a temperature sensor for sensing the temperature of the air space and for producing a sensed temperature signal corresponding to the temperature of the air space;

a manual temperature set point adjustment control for selecting, based on manual adjustments made by an operator, a comfort high temperature set point value representing a comfort high temperature set point, for selecting a comfort low temperature set point value representing a comfort low temperature set point, for selecting an energy-savings high temperature set point value representing an energy-savings high temperature set point, and for selecting an energy-savings low temperature set point value representing an energy-savings low temperature set point;

a memory device for storing the comfort high and low temperature set point values and the energy-savings high and low temperature set point values;

a controller for receiving the sensed temperature signal and the state of the operating mode control means, for accessing the comfort high and low temperature set point values and the energy-savings high and low temperature set point values from the memory device, the controller operable to activate the temperature management system to heat or cool the air space based on the sensed temperature signal, the state of the operating mode control means, and the temperature set point values.

2. The thermostat system of claim 1 wherein: the controller is further operable to activate the temperature management system to heat the air space when (a) the operating mode control means is in the energy-savings state, and (b) the sensed temperature signal indicates that the temperature of the air space is less than the energy-savings low temperature set point, the controller is further operable to activate the temperature management system to heat the air space when (c) the operating mode control means is in the comfort state, and (d) the sensed temperature signal indicates that the temperature of the air space is less than the comfort low temperature set point, the controller is further operable to activate the temperature management system to cool the air space when (e) the operating mode control means is in the energy-savings state, and (f) the sensed temperature signal indicates that the temperature of the air space is greater than the energy-savings high temperature set point, and the controller is further operable to activate the temperature management system to cool the air space when (g) the operating mode control means is in the comfort state, and (h) the sensed temperature signal indicates that the temperature of the air space is greater than the comfort high temperature set point.

3. The thermostat system of claim 1 further comprising:

the controller further for producing an under-temperature signal when the sensed temperature signal indicates that the temperature of the air space is less than a minimum temperature; and the telephone communication means further for communicating a notification telephone signal when the under-temperature signal is produced.

4. The thermostat system of claim 3 further comprising:

the memory device for storing a predetermined telephone number of a designated receiving telephone; and the telephone communication means for communicating the notification telephone signal to the receiving telephone by placing a telephone call to the predetermined telephone number when the under-temperature signal is produced.

5. The thermostat system of claim 3 further comprising the controller for producing the under-temperature signal when (i) the operating mode control means is in the energy-savings state, and (j) the sensed temperature signal indicates that the temperature of the air space is less than the energy-savings low temperature set point minus a predetermined number of temperature units.

6. The thermostat system of claim 1 further comprising:

the controller further for producing an over-temperature signal when the sensed temperature signal indicates that the temperature of the air space is greater than a maximum temperature; and the telephone communication means further for communicating a notification telephone signal when the over-temperature signal is produced.

7. The thermostat system of claim 6 further comprising:

the memory device for storing a predetermined telephone number of a designated receiving telephone; and the telephone communication means for communicating the notification telephone signal to the receiving telephone by placing a telephone call to the predetermined telephone number when the over-temperature signal is produced.

8. The thermostat system of claim 6 further comprising the controller for producing the over-temperature signal when (k) the operating mode control means is in the energy-savings state, and (l) the sensed temperature signal indicates that the temperature of the air space is greater than the energy-savings high temperature set point plus a predetermined number of temperature units.

9. The thermostat system of claim 5 wherein the predetermined number of temperature units is 10 degrees F.

10. The thermostat system of claim 8 wherein the predetermined number of temperature units is 10 degrees F.

11. The thermostat system of claim 1 further comprising a wireless transmitter unit for transmitting the wireless mode switching signal.

12. The thermostat system of claim 1 wherein the telephone communication means further comprises a modem operable to receive the telephonic switching signal over a telephone line.

13. The thermostat system of claim 1 wherein the telephone communication means further comprises a cellular telephone receiver operable to receive the telephonic switching signal over a cellular communication link.

14. The thermostat system of claim 1 further comprising a display device operable to display the comfort high and low temperature set point values, the energy-savings high and low temperature set point values, and the sensed temperature in a numerical format.

15. The thermostat system of claim 14 wherein the display device further comprises a liquid crystal display screen.

16. The thermostat system of claim 1 wherein the manual temperature set point adjustment means further comprise:

a set control that, when operated, causes the manual temperature set point adjustment control to switch between the comfort high temperature set point value, the comfort low temperature set point value, the energy-savings high temperature set point value, and the energy-savings low temperature set point value, thereby selecting one of the set point values to be a selected set point value;

an increment control that, when operated, causes the manual temperature set point adjustment control to increment the selected set point value; and a decrement control that, when operated, causes the manual temperature set point adjustment control to decrement the selected set point value.

17. A thermostat system for controlling activation of a temperature management system based on a temperature of an air space, the thermostat system operable in an energy-savings mode for enhancing energy savings and in a comfort mode for enhancing comfort, where the operating mode is selectable by a user, the thermostat system comprising:

a radio-frequency transmitter unit for transmitting a radio-frequency mode switching signal;

operating mode control means for switching between an energy-savings state and a comfort state, where the energy-savings state corresponds to system operation in the energy-savings mode and the comfort state corresponds to system operation in the comfort mode, the operating mode control means comprising:

a manual mode switch operable to cause the operating mode control means to switch between the energy-savings and the comfort states when pressed by the user;

a radio-frequency receiver for receiving a radio-frequency mode switching signal, the operating mode control means operable to switch between the energy-savings and the comfort states when the radio-frequency mode switching signal is received; and telephone communication means for receiving a telephonic mode switching signal over a telephone line, the operating mode control means operable to switch between the energy-savings and the comfort states when the telephonic mode switching signal is received;

a temperature sensor for sensing the temperature of the air space and for producing a sensed temperature signal based on the temperature of the air space;

manual temperature set point adjustment control for selecting, based on manual adjustments made by an operator, a comfort high temperature set point value representing a comfort high temperature set point, for selecting a comfort low temperature set point value representing a comfort low temperature set point, for selecting an energy-savings high temperature set point value representing an energy-savings high temperature set point, and for selecting an energy-savings low temperature set point value representing an energy-savings low temperature set point, the manual temperature set point adjustment control comprising:

- a set control that, when operated, causes the manual temperature set point adjustment control to switch between the comfort high temperature set point value, the comfort low temperature set point value, the energy-savings high temperature set point value, and the energy-savings low temperature set point value, thereby selecting one of the set point values to be a selected set point value;
- an increment control that, when operated, causes the manual temperature set point adjustment control to increment the selected set point value; and
- a decrement control that, when operated, causes the manual temperature set point adjustment control to decrement the selected set point value;

a liquid crystal display device operable to display the comfort high and low temperature set point values, the energy-savings high and low temperature set point values, and the sensed temperature in a numerical format a memory device for storing the comfort high and low temperature set point values, the energy-savings high and low temperature set point values, and a predetermined telephone number of a designated receiving telephone;

a controller for receiving the sensed temperature signal and the state of the operating mode control means, for accessing the comfort high and low temperature set point values and the energy-savings high and low temperature set point values from the memory device, the controller operable to activate the temperature management system to heat the air space when (a) the operating mode control means is in the energy-savings state, and (b) the sensed temperature signal indicates that the temperature of the air space is less than the energy-savings low temperature set point, the controller operable to activate the temperature management system to heat the air space when (c) the operating mode control means is in the comfort state, and (d) the sensed temperature signal indicates that the temperature of the air space is less than the comfort low temperature set point, the controller operable to activate the temperature management system to cool the air space when (e) the operating mode control means is in the energy-savings state, and (f) the sensed temperature signal indicates that the temperature of the air space is greater than the energy-savings high temperature set point, the controller operable to activate the temperature management system to cool the air space when (g) the operating mode control means is in the comfort state, and (h) the sensed temperature signal indicates that the temperature of the air space is greater than the comfort high temperature set point, the controller operable to produce an under-temperature signal when (i) the operating mode control means is in the energy-savings state, and (j) the sensed temperature signal indicates that the temperature of the air space is less than the energy-savings low temperature set point minus a predetermined number of temperature units, and the controller operable to produce an over-temperature signal when (k) the operating mode control means is in the energy-savings state, and (l) the sensed temperature signal indicates that the temperature of the air space is greater than the energy-savings high temperature set point plus the predetermined number of temperature units; and the telephone communication means further operable to send a notification telephone signal over the telephone line to the receiving telephone by placing a telephone call to the predetermined telephone number when the under-temperature signal or the over-temperature signal is produced.

* * * * *